United States Patent
Fujii et al.

(10) Patent No.: US 9,796,416 B2
(45) Date of Patent: Oct. 24, 2017

(54) AUTOMATED DRIVING APPARATUS AND AUTOMATED DRIVING SYSTEM

(71) Applicant: TOYOTA JIDOSHA KABUSHIKI KAISHA, Toyota-shi, Aichi-ken (JP)

(72) Inventors: Shota Fujii, Susono (JP); Keitaro Niki, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/274,135

(22) Filed: Sep. 23, 2016

(65) Prior Publication Data

US 2017/0088167 A1 Mar. 30, 2017

(30) Foreign Application Priority Data

Sep. 28, 2015 (JP) .................................. 2015-189339

(51) Int. Cl.
| | |
|---|---|
| *B62D 12/00* | (2006.01) |
| *B62D 6/00* | (2006.01) |
| *B62D 1/28* | (2006.01) |
| *B62D 15/02* | (2006.01) |

(52) U.S. Cl.
CPC ............. *B62D 6/002* (2013.01); *B62D 1/286* (2013.01); *B62D 15/025* (2013.01)

(58) Field of Classification Search
CPC ....... B62D 6/002; B62D 1/286; B62D 15/025
USPC ..................... 701/41, 400–541; 340/988–996
See application file for complete search history.

(56) References Cited

U.S. PATENT DOCUMENTS

| | | | | |
|---|---|---|---|---|
| 9,014,905 | B1 * | 4/2015 | Kretzschmar | G05D 1/021 701/28 |
| 9,523,984 | B1 * | 12/2016 | Herbach | B62D 15/025 |
| 2011/0130918 | A1 * | 6/2011 | Kim | G01C 21/26 701/31.4 |
| 2012/0283910 | A1 * | 11/2012 | Lee | B62D 1/286 701/41 |
| 2013/0060414 | A1 * | 3/2013 | Lee | B62D 1/286 701/23 |
| 2014/0330479 | A1 * | 11/2014 | Dolgov | B60W 30/16 701/28 |

FOREIGN PATENT DOCUMENTS

| | | |
|---|---|---|
| JP | 2000-072021 A | 3/2000 |
| JP | 4173292 B2 | 8/2008 |
| JP | 2010-042741 A | 2/2010 |

\* cited by examiner

*Primary Examiner* — Muhammad Shafi
(74) *Attorney, Agent, or Firm* — Sughrue Mion, PLLC

(57) ABSTRACT

A steering wheel control unit executes control such that a steering wheel rotates in accordance with a first target steering angle and the steering wheel rotates in accordance with a second target steering angle when a steering operation is detected. A target steering angle setting unit sets the second target steering angle that asymptotically approaches an actual steering angle from the first target steering angle with the lapse of time, during a period from when the steering operation is detected during the automated driving until when an end of the steering operation is detected, and sets the second target steering angle that asymptotically approaches the first target steering angle with the lapse of time after the end of the steering operation is detected. After the steering operation takes place, the reaction force gradually decreases. After the steering operation ends, the reaction force gradually increases.

4 Claims, 7 Drawing Sheets

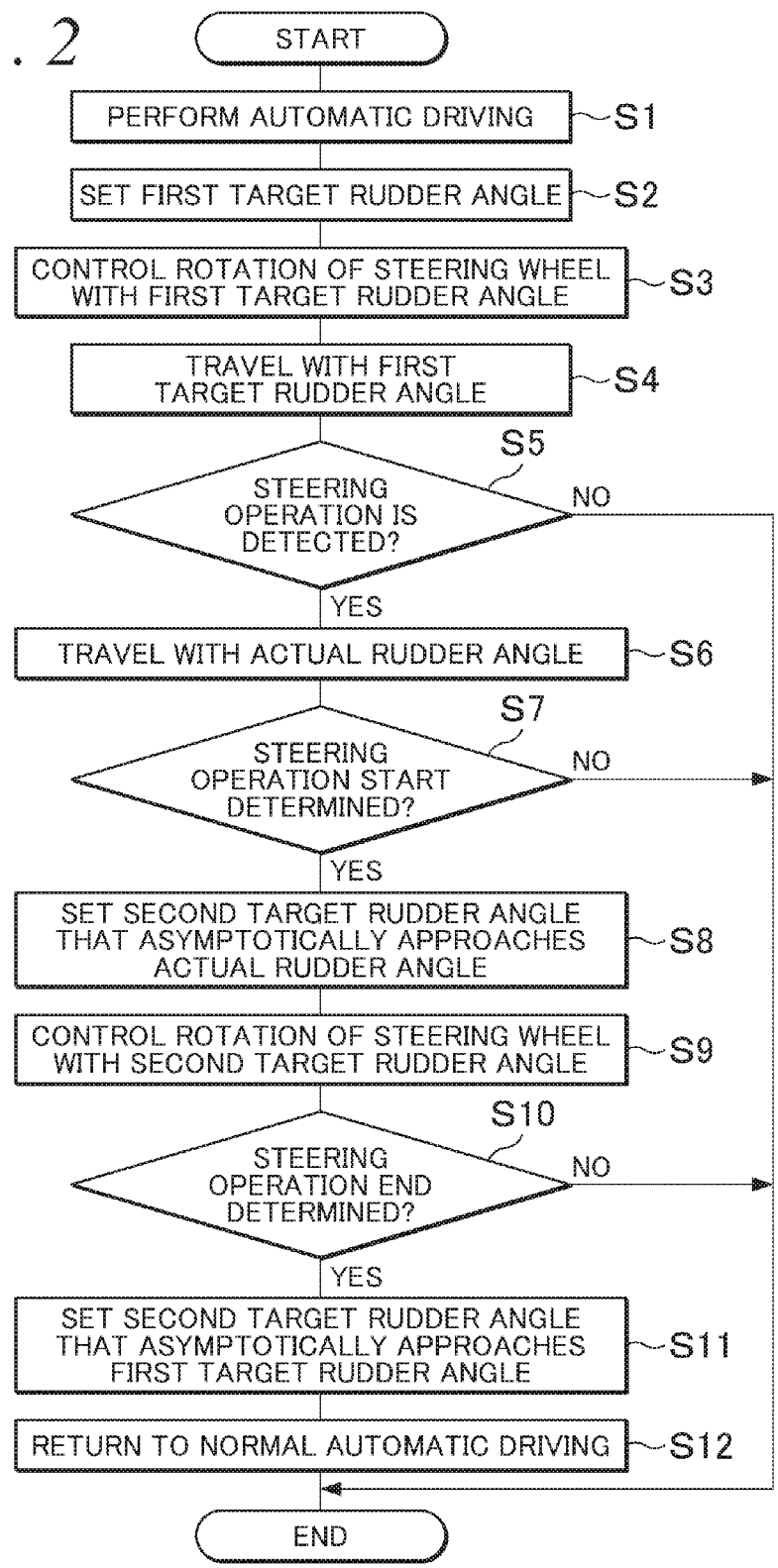

AUTOMATED DRIVING APPARATUS AND AUTOMATED DRIVING SYSTEM

INCORPORATION BY REFERENCE

The disclosure of Japanese Patent Application No. 2015-189339 filed on Sep. 28, 2015 including the specification, drawings and abstract is incorporated herein by reference in its entirety.

BACKGROUND

1. Technical Field

The disclosure relates to an automated driving apparatus and an automated driving system.

2. Description of the Related Art

As described in Japanese Patent No. 4173292, there is a known device configured to control a reaction force that is applied to a steering wheel operated by a driver, so as to prompt the driver to carry out a driving operation in accordance with a traveling path set based on a traveling environment around a host vehicle. Such a device enables automated driving, that is, enables the host vehicle to travel along a traveling path set based on a traveling environment around the host vehicle while the driver just puts his/her hands on the steering wheel.

SUMMARY

However, for example, when the host vehicle passes a truck on a left lane, the driver carries out a steering operation for making the lateral distance between the truck and the host vehicle greater than the lateral distance therebetween based on the set traveling path, in some cases. In this case, the device applies a large reaction force to the steering wheel operated by the driver, in order to return the host vehicle to the set traveling path. As a result, the ease of operation by the driver may be reduced, or the behavior of the host vehicle may become unstable. Moreover, even when the host vehicle has passed the truck and the driver reduces the force to be applied to the steering wheel, the device continues to apply a large reaction force to the steering wheel in order to return the host vehicle to the set traveling path. As a result, the behavior of the host vehicle may become unstable.

The present disclosure provides an automated driving apparatus and an automated driving system that are configured to enhance the ease of operation by a driver and the stability of the behavior of a host vehicle, when a steering operation of a steering wheel by the driver of the host vehicle takes place during automated driving and when the steering operation no longer takes place.

A first aspect of the present disclosure relates to an automated driving apparatus configured to execute automated driving of a host vehicle in accordance with a first target steering angle while controlling rotation of a steering wheel such that the steering wheel rotates by a rotation angle corresponding to the first target steering angle, and the automated driving apparatus configured to cause the host vehicle to temporarily travel in accordance with an actual steering angle corresponding to a rotation angle of the steering wheel when a steering operation of the steering wheel by a driver of the host vehicle takes place during the automated driving. The automated driving apparatus includes: a steering operation detection unit configured to detect the steering operation; a target steering angle setting unit configured to set the first target steering angle corresponding to a traveling environment around the host vehicle and a traveling state of the host vehicle during the automated driving, and target steering angle setting unit configured to set the first target steering angle and a second target steering angle based on the first target steering angle and the actual steering angle when the steering operation is detected by the steering operation detection unit during the automated driving; a steering control unit configured to execute steering control of the host vehicle in accordance with the first target steering angle during the automated driving, and the steering control unit configured to execute the steering control of the host vehicle in accordance with the actual steering angle when the steering operation is detected by the steering operation detection unit during the automated driving; and a steering wheel control unit configured to control the rotation of the steering wheel such that the steering wheel rotates by the rotation angle corresponding to the first target steering angle during the automated driving, and the steering wheel control unit configured to control the rotation of the steering wheel such that the steering wheel rotates by a rotation angle corresponding to the second target steering angle when the steering operation is detected by the steering operation detection unit during the automated driving. The target steering angle setting unit is configured to set the second target steering angle that asymptotically approaches the actual steering angle from the first target steering angle with a lapse of time, within a period from when the steering operation is detected by the steering operation detection unit during the automated driving until when an end of the steering operation is detected by the steering operation detection unit. The target steering angle setting unit is configured to set the second target steering angle that asymptotically approaches the first target steering angle with the lapse of time, after the steering operation detection unit detects the end of the steering operation detected by the steering operation detection unit during the automated driving.

With the above configuration, the target steering angle setting unit sets the first target steering angle corresponding to the traveling environment around the host vehicle and the traveling state of the host vehicle during the automated driving, and sets the first target steering angle and the second target steering angle when the steering operation is detected during the automated driving. The steering wheel control unit controls the rotation of the steering wheel such that the steering wheel rotates in accordance with the first target steering angle during the automated driving and the steering wheel rotates in accordance with the second target steering angle when the steering operation is detected during the automated driving. Furthermore, the target steering angle setting unit sets the second target steering angle that asymptotically approaches the actual steering angle from the first target steering angle with the lapse of time, within the period from when the steering operation is detected during the automated driving until when the end of the steering operation is detected, and the target steering angle setting unit sets the second target steering angle that asymptotically approaches the first target steering angle with the lapse of time, after the end of the steering operation detected during the automated driving is detected. Thus, after the steering operation of the steering wheel by the driver of the host vehicle takes place during the automated driving, a reaction force applied to the steering wheel operated by the driver gradually decreases. After the steering operation ends, the reaction force applied to the steering wheel operated by the driver gradually increases. Thus, the ease of operation by the driver and the stability of the behavior of the host vehicle are enhanced, when the steering operation of the steering wheel by the driver of the host vehicle takes place during the automated driving and when the steering operation no longer takes place.

The automated driving apparatus according to the first aspect may further include an indication control unit. The indication control unit is configured to cause an indicator of the host vehicle to indicate a steering operation non-detection indication for notifying the driver of the host vehicle that the steering operation is not detected, when the steering operation is not detected by the steering operation detection unit and when the end of the steering operation is detected by the steering operation detection unit. The indication control unit is configured to cause the indicator to indicate a steering operation detection indication for notifying the driver of the host vehicle that the steering operation is detected, when the steering operation is detected by the steering operation detection unit.

With the above configuration, the indicator indicates the steering operation non-detection indication for notifying the driver of the host vehicle that the steering operation is not detected, when the steering operation is not detected by the steering operation detection unit and when the end of the steering operation is detected by the steering operation detection unit. Further, the indicator indicates the steering operation detection indication for notifying the driver of the host vehicle that the steering operation is detected, when the steering operation is detected by the steering operation detection unit. This enables the driver to recognize whether or not the automated driving apparatus detects the steering operation by the driver and controls the rotation of the steering wheel based on the detection.

A second aspect of the present disclosure relates to an automated driving system configured to execute automated driving of a host vehicle in accordance with a first target steering angle while controlling rotation of a steering wheel such that the steering wheel rotates by a rotation angle corresponding to the first target steering angle, and the automated driving system configured to cause the host vehicle to temporarily travel in accordance with an actual steering angle corresponding to a rotation angle of the steering wheel when a steering operation of the steering wheel by a driver of the host vehicle takes place during the automated driving, the automated driving system includes: a steering sensor that detects and outputs an amount of the steering operation of the steering wheel; a steering actuator that controls a steering angle of the host vehicle; a steering wheel actuator that controls a torque to be applied to the steering wheel; and an electronic control unit configured to: detect the steering operation; set the first target steering angle corresponding to a traveling environment around the host vehicle and a traveling state of the host vehicle during the automated driving, and set the first target steering angle and a second target steering angle based on the first target steering angle and the actual steering angle when the steering operation is detected during the automated driving; control the steering actuator based on the first target steering angle during the automated driving, and control the steering actuator based on the actual steering angle when the steering operation is detected during the automated driving; and control the steering wheel actuator such that the steering wheel rotates by the rotation angle corresponding to the first target steering angle during the automated driving, and control the steering wheel actuator such that the steering wheel rotates by a rotation angle corresponding to the second target steering angle when the steering operation is detected during the automated driving, wherein the electronic control unit is configured to set the second target steering angle that asymptotically approaches the actual steering angle from the first target steering angle with a lapse of time, within a period from when the steering operation is detected during the automated driving until when an end of the steering operation is detected, and the electronic control unit is configured to set the second target steering angle that asymptotically approaches the first target steering angle with the lapse of time, after the end of the steering operation detected during the automated driving is detected.

The automated driving system according to the second aspect may further include an indicator. The electronic control unit may be configured to cause the indicator to indicate a first indication for notifying the driver of the host vehicle that the steering operation is not detected, when the steering operation is not detected. The electronic control unit may be configured to cause the indicator to indicate a second indication for notifying the driver of the host vehicle that the steering operation is detected, when the steering operation is detected.

According to the aspects of the present disclosure, it is possible to enhance the ease of operation by the driver and the stability of the behavior of the host vehicle, when a steering operation of the steering wheel by the driver of the host vehicle takes place during automated driving and when the steering operation no longer takes place.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a flowchart illustrating the operation of the automated driving apparatus in FIG. 1;

DETAILED DESCRIPTION OF EMBODIMENTS

First Embodiment

Figure 1:
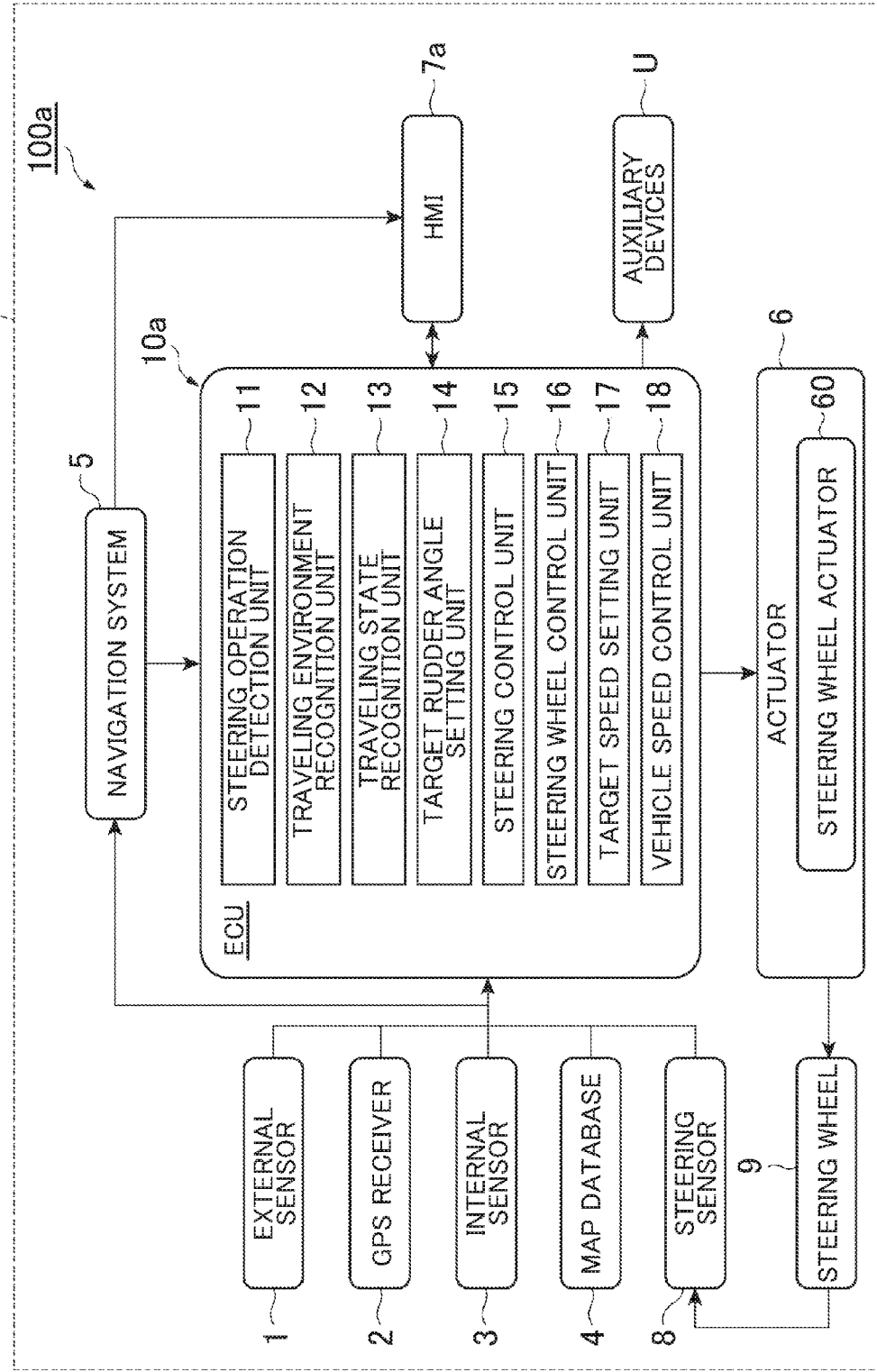
FIG. 1 is a block diagram illustrating the configuration of an automated driving apparatus according to a first embodiment.

Hereinafter, a first embodiment of the present disclosure will be described in detail with reference to the accompanying drawings. As illustrated in FIG. 1, an automated driving apparatus 100a of the first embodiment is mounted in a host vehicle V, such as an automobile. The automated driving apparatus 100a executes automated driving of the host vehicle V in accordance with a first target steering angle (described later), while controlling the rotation of a steering wheel such that the steering wheel rotates by a rotation angle corresponding to the first target steering angle. When a steering operation of the steering wheel by a driver of the host vehicle V takes place during the automated driving, the automated driving apparatus 100a causes the host vehicle V to temporarily travel in accordance with an actual steering angle corresponding to the rotation angle of the steering wheel. Automated driving of the host vehicle V means that driving operations of the host vehicle V, such as acceleration, deceleration, and steering, are executed without driving operations by the driver of the host vehicle V. The actual steering angle means a steering angle of the host vehicle V corresponding to the rotation angle of the steering wheel. That is, the actual steering angle is the same as a steering angle of the host vehicle V when the host vehicle V travels in accordance with a steering operation by the driver of the host vehicle V during manual driving.

As illustrated in FIG. 1, the automated driving apparatus 100a includes an external sensor 1, a global positioning system (GPS) receiver 2, an internal sensor 3, a map database 4, a navigation system 5, an actuator 6, a human machine interface (HMI) 7a, a steering sensor 8, a steering wheel 9, auxiliary devices U, and an electronic control unit (ECU) 10a.

The external sensor 1 is a detector that detects an outside condition that is the information about the surroundings of the host vehicle V. The external sensor 1 includes at least one of a camera, a radar, and a laser imaging detection and ranging (LIDAR).

The camera is an image-capturing device that captures images of the condition outside the host vehicle V. The camera is provided, for example, on the back side of a windshield of the host vehicle V. The camera may be a monocular camera or may be a stereoscopic camera. The stereoscopic camera has, for example, two image-capturing units that are arranged so as to reproduce a binocular disparity. The image information captured by the stereoscopic camera includes the depth-directional information. The camera outputs, to the ECU 10a, the captured image information about the condition outside the host vehicle V.

The radar detects an obstacle outside the host vehicle V using radio waves. The radio waves are, for example, millimeter waves. The radar emits radio waves to the environment around the host vehicle V, and receives the radio waves reflected from an obstacle, thereby detecting the obstacle. The radar can output, for example, the distance or direction to the obstacle, as the obstacle information that is the information about the obstacle. The radar outputs the detected obstacle information to the ECU 10a. When sensor fusion is executed, the reflected radio wave reception information may be output to the ECU 10a.

The LIDAR detects an obstacle outside the host vehicle V using light. The LIDAR emits light to the environment around the host vehicle V, and receives the light reflected from an obstacle to measure the distance to the reflecting point, thereby detecting the obstacle. The LIDAR can output, for example, the distance or direction to the obstacle, as the obstacle information. The LIDAR outputs the detected obstacle information to the ECU 10a. When sensor fusion is executed, the reflected light reception information may be output to the ECU 10a. Note that, it is not necessary to provide two or all of the camera, the LIDAR, and the radar, that is, providing one of the camera, the LIDAR, and the radar is enough.

The GPS receiver 2 receives signals from three or more GPS satellites to acquire the positional information indicating the position of the host vehicle V. The positional information includes, for example, the latitude and longitude of a position where the host vehicle V is present. The GPS receiver 2 outputs the measured positional information about the host vehicle V to the ECU 10a. The GPS receiver 2 may be replaced with another device that can identify the latitude and longitude of a position where the host vehicle V is present.

The internal sensor 3 is a detector that detects information corresponding to the traveling state of the host vehicle V. The internal sensor 3 includes at least one of a vehicle speed sensor, an acceleration sensor, and a yaw rate sensor in order to detect the information corresponding to the traveling state of the host vehicle V.

The vehicle speed sensor is a detector that detects a speed of the host vehicle V. Examples of the vehicle speed sensor include a wheel speed sensor provided, for example, in a wheel of the host vehicle V or on a drive shaft that rotates together with the wheel of the host vehicle V to detect a rotation speed of the wheel. The vehicle speed sensor outputs, to the ECU 10a, the vehicle speed information (wheel speed information) including the speed of the host vehicle V.

The acceleration sensor is a detector that detects an acceleration of the host vehicle V. The acceleration sensor includes, for example, a longitudinal acceleration sensor that detects an acceleration in the longitudinal direction (front-rear direction) of the host vehicle V and a lateral acceleration sensor that detects a lateral acceleration of the host vehicle V. The acceleration sensor outputs, to the ECU 10a, the acceleration information including the acceleration of the host vehicle V.

The yaw rate sensor is a detector that detects a yaw rate (rotational angular velocity) around the vertical axis that passes through the center of gravity of the host vehicle V. As the yaw rate sensor, for example, a gyro sensor may be used. The yaw rate sensor outputs, to the ECU 10a, the yaw rate information including the yaw rate of the host vehicle V.

The map database 4 is a database including the map information. The map database 4 is provided in, for example, a hard disk drive (HDD) mounted in the host vehicle V. The map information includes, for example, the positional information about roads, road shape information, and positional information about intersections and junctions. The road shape information includes, for example, types of curves and straight paths, and curvatures of the curves. Furthermore, the map information may include output signals from the external sensor 1, when the automated driving apparatus 100a uses the positional information about shielding structures, such as buildings and walls, or uses a simultaneous localization and mapping (SLAM) technology. The map database 4 may be stored in a computer installed in a facility, such as an information processing center that can communicate with the host vehicle V.

The navigation system 5 is a device that provides the driver of the host vehicle V with route guidance to a destination set on the map by the driver of the host vehicle V. The navigation system 5 calculates a route along which the host vehicle V travels, based on the positional information about the host vehicle V measured by the GPS receiver 2 and the map information in the map database 4. The navigation system 5 calculates, for example, a target route from the position of the host vehicle V to a destination, and notifies the driver of the target route by indicating the target route on a display or by outputting the target route by voice from a speaker. The navigation system 5 outputs, to the ECU 10*a*, the information about the target route for the host vehicle V, for example. The navigation system 5 may use the information stored in a computer of a facility, such as an information processing center, which can communicate with the host vehicle V. Alternatively, part of a process executed by the navigation system 5 may be executed by the computer in the facility.

The actuator 6 is a device that executes traveling control of the host vehicle V. The actuator 6 includes a steering actuator, a steering wheel actuator 60, a throttle actuator, and a brake actuator.

The steering actuator controls driving of an assist motor that controls the steering angle in response to a control signal from the ECU 10*a*. The assist motor is included in an electric power steering system. Thus, the steering actuator controls the steering angle of the host vehicle V. The steering angle of the host vehicle V controlled by the steering actuator includes not only the steering angle of front wheels of the host vehicle V but also the steering angle of the rear wheels of the host vehicle V. The steering wheel actuator 60 controls driving of a servo motor that rotates the steering wheel 9, in response to a control signal from the ECU 10*a*. The steering wheel actuator 60 controls the torque to be applied to the steering wheel 9, thereby controlling, as appropriate, the reaction force against a steering operation of the steering wheel 9 by the driver of the host vehicle V.

The throttle actuator controls the amount of air to be supplied to the engine (i.e., throttle opening degree) in response to a control signal from the ECU 10*a*, thereby controlling the driving force of the host vehicle V. When the host vehicle V is a hybrid vehicle or an electric vehicle, a throttle actuator is not provided, so that a control signal from the ECU 10*a* is input into a motor that serves as a power source and the driving force of the host vehicle V is controlled based on the control signal.

The brake actuator controls a brake system in response to a control signal from the ECU 10*a*, thereby controlling the braking force to be applied to the wheels of the host vehicle V. As the brake system, for example, a hydraulic brake system may be used.

The HMI 7*a* is an interface through which the information from the driver of the host vehicle V is input into the automated driving apparatus 100*a* or the information from the automated driving apparatus 100*a* is output to the driver of the host vehicle V. The HMI 7*a* includes, for example, a display panel for displaying the image information to the driver, a speaker for outputting voice, and a manual operation button or touch panel with which the driver performs an input operation. The HMI 7*a* may output the information to the driver using a personal digital assistant that is wirelessly connected to the HMI 7*a*, and may receive a driver's input operation using the personal digital assistant.

The steering sensor 8 is a detector that detects, for example, an amount of steering operation of the steering wheel 9 by the driver of the host vehicle V. The amount of steering operation detected by the steering sensor is, for example, a steering torque applied to the steering wheel 9, or a rotation angle of the steering wheel 9. The steering sensor 8 is provided, for example, on the steering shaft of the host vehicle V. The steering sensor 8 outputs, to the ECU 10*a*, the information including the steering torque to be applied to the steering wheel 9 or the rotation angle of the steering wheel 9.

The auxiliary devices U are devices that can be usually operated by the driver of the host vehicle V. The devices that are not included in the actuator 6 are collectively referred to as the auxiliary devices U. The auxiliary devices U in this case include, for example, a directional light, a head light, and a windshield wiper.

The ECU 10*a* controls the automated driving of the host vehicle V. The ECU 10*a* is an electronic control unit including, for example, a central processing unit (CPU), a read-only memory (ROM), and a random-access memory (RAM). The ECU 10*a* includes a steering operation detection unit 11, a traveling environment recognition unit 12, a traveling state recognition unit 13, a target steering angle setting unit 14, a steering control unit 15, a steering wheel control unit 16, a target vehicle speed setting unit 17, and a vehicle speed control unit 18. In the ECU 10*a*, a program stored in the ROM is loaded into the RAM and is executed by the CPU, so that control of each unit, such as the steering operation detection unit 11, is executed. The ECU 10*a* may be constituted by a plurality of electronic control units.

The steering operation detection unit 11 detects a steering operation by the driver of the host vehicle V. When the torque applied to the steering wheel 9 through the steering operation by the driver of the host vehicle V becomes equal to or higher than a detection lower limit of the steering sensor 8, the steering operation detection unit 11 detects that a steering operation by the driver of the host vehicle V takes place. When the torque applied to the steering wheel 9 through the steering operation by the driver of the host vehicle V becomes equal to or higher than a steering operation start determination threshold set in advance, the steering operation detection unit 11 detects the start of the steering operation (intentional steering operation) by the driver of the host vehicle V. The steering operation start determination threshold may be set to a value of about 1 Nm, for example. After the detection of the steering operation by the driver of the host vehicle V, when the torque applied to the steering wheel 9 through the steering operation by the driver of the host vehicle V becomes equal to or lower than a steering operation end determination threshold set in advance, the steering operation detection unit 11 detects the end of the steering operation by the driver of the host vehicle V. In order to prevent repeated detection of the start of a steering operation and the end of the steering operation in a short period of time, the steering operation start determination threshold is set higher than the steering operation end determination threshold.

The steering operation detection unit 11 may detect that a steering operation by the driver of the host vehicle V takes place, when a variation in the rotation angle of the steering wheel 9 per unit time becomes equal to or larger than a detection lower limit of the steering sensor 8. Further, the steering operation detection unit 11 may detect the start of the steering operation (intentional steering operation) by the driver of the host vehicle V, when the variation in the rotation angle of the steering wheel 9 per unit time becomes equal to or larger than a steering operation start determination threshold set in advance. After the detection of the steering operation by the driver of the host vehicle V, when the variation in the rotation angle of the steering wheel 9 per unit time becomes equal to or smaller than a steering operation end determination threshold set in advance, the steering operation detection unit 11 may detect the end of the steering operation by the driver of the host vehicle V.

For example, the steering operation start determination threshold may be set to a value equal to the detection lower limit of the steering sensor 8, and the steering operation detection unit 11 may detect the start of a steering operation (intentional steering operation) by the driver of the host vehicle V when detecting that the steering operation by the driver of the host vehicle V takes place. Further, for example, the steering operation end determination threshold may be set to a value equal to the detection lower limit of the steering sensor 8, and the steering operation detection unit 11 may detect the end of the steering operation by the driver of the host vehicle V when detecting that the steering operation by the driver of the host vehicle V no longer takes place.

The traveling environment recognition unit 12 recognizes the traveling environment around the host vehicle V based on the information acquired by the camera or the like of the external sensor 1, the GPS receiver 2, and the map database 4. The traveling environment means the condition outside the host vehicle V. The traveling environment means, for example, the shape of a road ahead of the host vehicle V, the curvature of the road ahead of the host vehicle V, and the position and relative velocity of an obstacle such as another vehicle around the host vehicle V.

The traveling state recognition unit 13 recognizes the traveling state of the host vehicle V based on the information acquired by the external sensor 1, the GPS receiver 2, the internal sensor 3, and the map database 4. The traveling state means the speed, acceleration, yaw rate, and position of the host vehicle V. The position of the host vehicle V in motion includes the lateral position of the host vehicle V relative to the reference position (e.g. the center of the lane) of the host vehicle V in the lane.

The target steering angle setting unit 14 sets a first target steering angle corresponding to the traveling environment around the host vehicle V recognized by the traveling environment recognition unit 12 and the traveling state of the host vehicle V recognized by the traveling state recognition unit 13 during the automated driving. The first target steering angle is determined, by the automated driving apparatus 100a, to be an ideal steering angle for the traveling environment around the host vehicle V and the traveling state of the host vehicle V. The first target steering angle is, for example, such a steering angle that the host vehicle V keeps traveling in the center of the lane. When a steering operation is detected by the steering operation detection unit 11 during the automated driving, the target steering angle setting unit 14 sets the first target steering angle and a second target steering angle based on the first target steering angle and the actual steering angle. The second target steering angle is a steering angle obtained through coordination between the first target steering angle and the actual steering angle. The first target steering angle is determined, by the automated driving apparatus 100a, to be an ideal steering angle for the traveling environment around the host vehicle V and the traveling state of the host vehicle V. The actual steering angle is achieved by a steering operation by the driver of the host vehicle V. The second target steering angle is set to a steering angle between the first target steering angle and the actual steering angle.

In the later-provided description of an operation of the automated driving apparatus 100a, the case where the start of a steering operation (intentional steering operation) by the driver of the host vehicle V is detected by the steering operation detection unit 11 during the automated driving will be used as an example of the case where a steering operation is detected by the steering operation detection unit 11 during the automated driving and the target steering angle setting unit 14 sets the second target steering angle. Alternatively, the target steering angle setting unit 14 may set the second target steering angle when the steering operation detection unit 11 detects that a steering operation by the driver of the host vehicle V takes place during the automated driving.

The steering control unit 15 executes the steering control in accordance with the first target steering angle set by the target steering angle setting unit 14, while transmitting a control signal to the steering actuator of the actuator 6 during the automated driving. When a steering operation by the driver of the host vehicle V is detected during the automated driving, the steering control unit 15 executes the steering control of the host vehicle V in accordance with the actual steering angle corresponding to the rotation angle of the steering wheel 9, while transmitting a control signal to the steering actuator of the actuator 6.

In the later-provided description of an operation of the automated driving apparatus 100a, the case where the steering operation detection unit 11 detects that a steering operation by the driver of the host vehicle V takes place during the automated driving will be used as an example of the case where a steering operation is detected by the steering operation detection unit 11 during the automated driving and the steering control unit 15 executes the steering control of the host vehicle V in accordance with the actual steering angle. Alternatively, the steering control unit 15 may execute the steering control of the host vehicle V in accordance with the actual steering angle when the steering operation detection unit 11 detects the start of the steering operation (intentional steering operation) by the driver of the host vehicle V during the automated driving.

The steering wheel control unit 16 controls the rotation of the steering wheel 9 while transmitting a control signal to the steering wheel actuator 60 of the actuator 6, such that the steering wheel 9 rotates by a rotation angle corresponding to the first target steering angle during the automated driving. When the steering operation detection unit 11 detects a steering operation by the driver of the host vehicle V during the automated driving, the steering wheel control unit 16 controls the rotation of the steering wheel 9 while transmitting a control signal to the steering wheel actuator 60, such that the steering wheel 9 rotates by a rotation angle corresponding to the second target steering angle. Examples of the rotation angle corresponding to the first target steering angle include a rotation angle of the steering wheel 9 corresponding to the first target steering angle and the vehicle speed of the host vehicle V, in addition to a rotation angle of the steering wheel 9 in proportion to the degree of the first target steering angle. Examples of the rotation angle of the steering wheel 9 corresponding to the first target steering angle and the vehicle speed of the host vehicle V include a rotation angle of the steering wheel 9 that becomes larger with respect to the degree of the first target steering angle as the vehicle speed of the host vehicle V becomes higher. This also applies to the rotation angle corresponding to the second target steering angle.

The target vehicle speed setting unit 17 sets a target vehicle speed corresponding to the traveling environment around the host vehicle V recognized by the traveling environment recognition unit 12 and the traveling state of the host vehicle V recognized by the traveling state recognition unit 13 during the automated driving. The vehicle speed control unit 18 controls the vehicle speed of the host vehicle V while transmitting a control signal to the accelerator actuator and the brake actuator of the actuator 6, such that the host vehicle V travels at the target vehicle speed set by the target vehicle speed setting unit 17.

Hereinafter, an operation of the automated driving apparatus 100*a* of the present embodiment will be described. As illustrated in FIG. 2, the automated driving apparatus 100*a* executes automated driving of the host vehicle V (S1). The target steering angle setting unit 14 of the ECU 10*a* sets a first target steering angle (S2). The target steering angle setting unit 14 calculates a target travel path along which the host vehicle V should travel, based on, for example, the shape of a road ahead of the host vehicle V recognized by the traveling environment recognition unit 12 of the ECU 10*a*. The target steering angle setting unit 14 calculates a target travel path along which the host vehicle V should travel, based on, for example, the curvature of a road ahead of the host vehicle V and target values, such as a target lateral position of the host vehicle V relative to the reference position in the lane and a target orientation (yaw angle) of the host vehicle V. The target steering angle setting unit 14 sets the first target steering angle such that the host vehicle V travels along the calculated target path.

In this case, the target steering angle setting unit 14 sets the first target steering angle through feedforward control based on, for example, the curvature of the road ahead of the host vehicle V recognized by the traveling environment recognition unit 12. The target steering angle setting unit 14 may set the first target steering angle through feedback control based on the amounts of deviations of the lateral position of the host vehicle V and the yaw angle recognized by the traveling state recognition unit 13 of the ECU 10*a* from the target values.

The steering wheel control unit 16 of the ECU 10*a* controls the rotation of the steering wheel 9 such that the steering wheel 9 rotates by a rotation angle corresponding to the first target steering angle (S3). The steering control unit 15 of the ECU 10*a* executes the steering control of the host vehicle V such that the host vehicle V travels in accordance with the first target steering angle (S4).

Figure 3A:
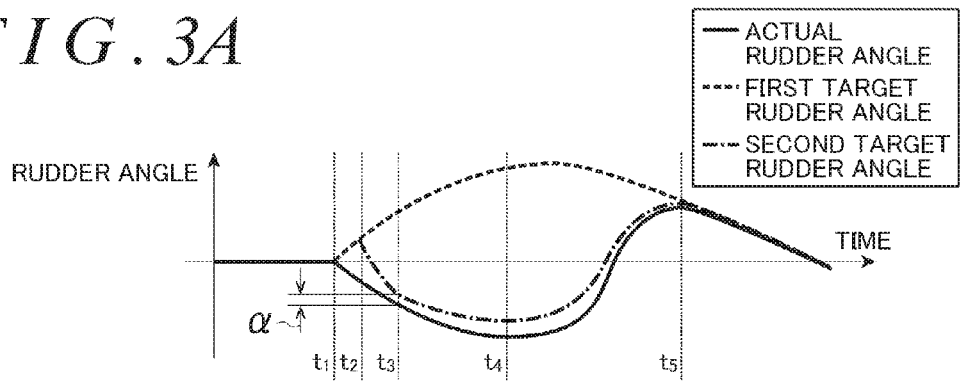
FIG. 3A is a graph illustrating the temporal variations in an actual steering angle, a first target steering angle, and a second target steering angle.
Figure 3B:
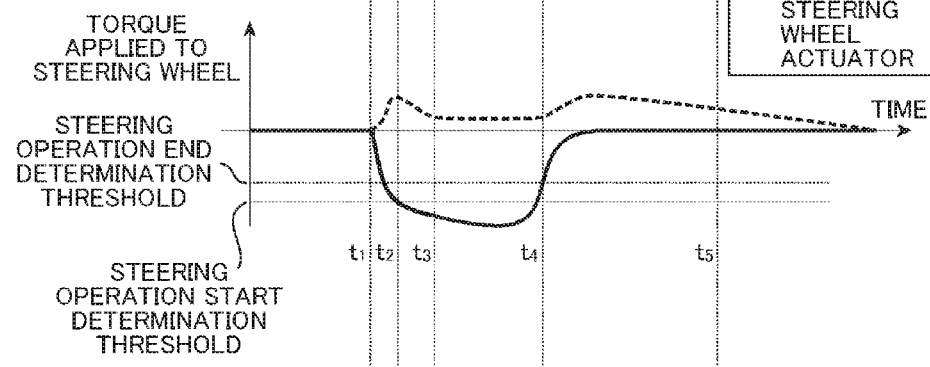
FIG. 3B is a graph illustrating the temporal variations in a torque applied to a steering wheel through a steering operation and a torque applied to the steering wheel by a steering actuator.
Figure 3C:
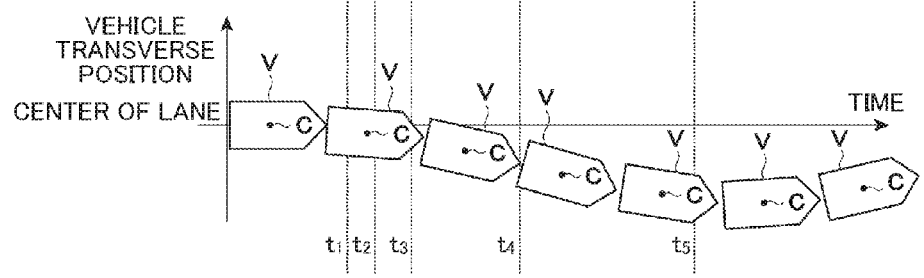
FIG. 3C is a graph illustrating the temporal variations in the lateral position of a host vehicle.

For example, when the host vehicle V is traveling on a straight path, both the actual steering angle and the first target steering angle are zero before time $t_1$, as illustrated in FIG. 3A. As illustrated in FIG. 3B, both the torque applied to the steering wheel 9 through a steering operation by the driver and the torque applied to the steering wheel 9 by the steering wheel actuator 60 are zero before time $t_1$. As illustrated in FIG. 3C, before time $t_1$, the lateral position of the host vehicle V is at the center of the lane. The vehicle lateral position in FIG. 3C represents a lateral position of a vehicle center c of the host vehicle V with respect to the center of the lane (i.e., a distance between the vehicle center c of the host vehicle V and the center of the lane in a direction perpendicular to the lane). The lateral position may be a lateral position of the center of gravity of the host vehicle V with respect to the center of the lane.

Next, description will be provided on a case where, when the host vehicle V passes a truck on the left lane, the driver of the host vehicle V temporarily carries out a steering operation for making the lateral distance between the truck and the host vehicle V greater than the lateral distance therebetween based on the traveling path corresponding to the first target steering angle. As illustrated in FIG. 2, when the steering operation detection unit 11 detects that such a steering operation takes place (S5), the steering control unit 15 executes the steering control of the host vehicle V such that the host vehicle V travels in accordance with the actual steering angle (S6). When the steering operation detection unit 11 does not detect that such a steering operation takes place (S5), the steering control unit 15 continues the steering control in accordance with the first target steering angle, as described above.

As illustrated in FIGS. 3A and 3C, the host vehicle V travels in accordance with the actual steering angle during a period from time $t_1$ to time $t_2$. As illustrated in FIG. 3C, the deviation of the lateral position of the host vehicle V from the center of the lane becomes larger. The target steering angle setting unit 14 sets the first target steering angle for returning the host vehicle V to the center of the lane based on the traveling environment around the host vehicle V and the traveling state of the host vehicle V. The steering wheel control unit 16 controls the rotation of the steering wheel 9 such that the steering wheel 9 rotates by a rotation angle corresponding to the first target steering angle. Thus, as illustrated in FIG. 3B, during the period from time $t_1$ to time $t_2$, the torque applied to the steering wheel 9 by the steering wheel actuator 60 increases in response to the torque applied to the steering wheel 9 through the steering operation by the driver.

When the steering operation detection unit 11 of the ECU 10*a* detects the start of the steering operation (intentional steering operation) by the driver of the host vehicle V during the automated driving (S7), the target steering angle setting unit 14 sets the first target steering angle and a second target steering angle based on the first target steering angle and the actual steering angle (S8). The steering wheel control unit 16 controls the rotation of the steering wheel 9 such that the steering wheel 9 rotates by a rotation angle corresponding to the second target steering angle (S9). When the start of the steering operation (intentional steering operation) by the driver of the host vehicle V is not detected by the steering operation detection unit 11 (S7), the target steering angle setting unit 14 continues setting of the first target steering angle, the steering control unit 15 continues the steering control in accordance with the actual steering angle, and the steering wheel control unit 16 continues the control of the rotation of the steering wheel 9 in accordance with the first target steering angle, as described above.

As illustrated in FIG. 3B, at time $t_2$, the torque applied to the steering wheel 9 through the steering operation by the driver becomes equal to or higher than the steering operation start determination threshold. As illustrated in FIG. 3A, in a period from time $t_2$ to time $t_3$, the target steering angle setting unit 14 sets the second target steering angle that asymptotically approaches the actual steering angle from the first target steering angle with the lapse of time. The steering wheel control unit 16 controls the rotation of the steering wheel 9 such that the steering wheel 9 rotates by a rotation angle corresponding to the second target steering angle. Thus, as illustrated in FIG. 3B, in the period from time $t_2$ to time $t_3$, the torque applied to the steering wheel 9 by the steering wheel actuator 60 decreases with the lapse of time, with respect to the torque applied to the steering wheel 9 through the steering operation by the driver.

"The second target steering angle asymptotically approaches the actual steering angle from the first target steering angle with the lapse of time" means, for example, that the second target steering angle becomes a steering angle that deviates from the actual steering angle toward the first target steering angle by a preset steering angle α, with the lapse of time. As illustrated in FIG. 3A, in a period from time $t_3$ to time $t_4$, the target steering angle setting unit 14 sets the second target steering angle that is a steering angle that deviates from the actual steering angle toward the first target steering angle by the preset steering angle α. The steering wheel control unit 16 controls the rotation of the steering wheel 9 such that the steering wheel 9 rotates by a rotation angle corresponding to the second target steering angle that deviates from the actual steering angle toward the first target steering angle by the preset steering angle α. Thus, as illustrated in FIG. 3B, the driver feels a reaction force corresponding to the steering angle α, which is the difference between the actual steering angle and the second target steering angle, in the period from time $t_3$ to time $t_4$.

The steering angle α corresponds to the reaction force applied to the steering wheel 9 in order to notify the driver of the intention of the automated driving apparatus 100a. For example, in order to apply a large reaction force, the steering angle α is set to a large value. On the other hand, in order to apply a small reaction force, the steering angle α is set to a small value. In this way, the magnitude of a reaction force applied to the steering wheel 9 to be felt by the driver can be adjusted in accordance with the steering angle α. The steering angle α may be a fixed value. Alternatively, the steering angle α may be set as a value corresponding to the speed of the host vehicle V. Further alternatively, the steering angle α may be set to a larger value, as the difference between the actual steering angle and the first target steering angle is larger. Further alternatively, the steering angle α may be set to zero to prevent the driver from feeling a reaction force with the lapse of time.

Thus, the target steering angle setting unit 14 sets the second target steering angle that asymptotically approaches the actual steering angle from the first target steering angle with the lapse of time, during a period from when the steering operation is detected by the steering operation detection unit 11 during the automated driving until when the end of the steering operation is detected by the steering operation detection unit 11. The second target steering angle may asymptotically approach the actual steering angle from the first target steering angle with the lapse of time, in the entire or a part of the period from when the steering operation is detected by the steering operation detection unit 11 during the automated driving until when the steering operation is no longer detected by the steering operation detection unit 11. The period from time $t_2$ to time $t_3$, in which the second target steering angle becomes a steering angle that deviates from the actual steering angle toward the first target steering angle by the preset steering angle α, may be a fixed period, or may be set to a shorter period as the difference between the actual steering angle and the first target steering angle is larger.

As illustrated in FIG. 2, after the steering operation detection unit 11 detects the end of the steering operation detected by the steering operation detection unit 11 during the automated driving (S10), the target steering angle setting unit 14 sets the second target steering angle that asymptotically approaches the first target steering angle with the lapse of time (S11). "The second target steering angle asymptotically approaches the first target steering angle with the lapse of time" means, for example, that the second target steering angle becomes equal to the first target steering angle with the lapse of time. When the end of steering operation is not detected by the steering operation detection unit 11 (S10), the target steering angle setting unit 14 continues setting of the second target steering angle that asymptotically approaches the actual steering angle, the steering control unit 15 continues steering control in accordance with the actual steering angle, and the steering wheel control unit 16 continues the rotation control of the steering wheel 9 in accordance with the second target steering angle that asymptotically approaches the actual steering angle, as described above.

As illustrated in FIG. 3B, at time $t_4$, the torque applied to the steering wheel 9 through the steering operation by the driver becomes equal to or lower than the steering operation end determination threshold. As illustrated in FIG. 3A, in a period from time $t_4$ to time $t_5$, the target steering angle setting unit 14 sets the second target steering angle that asymptotically approaches the first target steering angle with the lapse of time. The steering wheel control unit 16 controls the rotation of the steering wheel 9 such that the steering wheel 9 rotates by a rotation angle corresponding to the second target steering angle. Thus, as illustrated in FIG. 3B, the torque applied to the steering wheel 9 by the steering wheel actuator 60 increases with the lapse of time during a period immediately after time $t_4$. Thus, the driver feels a reaction force that increases with the lapse of time during the period immediately after time $t_4$.

As illustrated in FIG. 3B, in the period from time $t_4$ to time $t_5$, the torque applied to the steering wheel 9 through the steering operation by the driver becomes zero, and the driver is placed in a state in which the driver just puts his/her hands on the steering wheel 9 that is rotated by the steering wheel actuator 60. The steering wheel 9 rotates by a rotation angle corresponding to the second target steering angle, and the steering control unit 15 executes the steering control of the host vehicle V in accordance with the actual steering angle corresponding to the rotation angle of the steering wheel 9. Thus, as illustrated in FIG. 3A, in the period from time $t_4$ to time $t_5$, the actual steering angle also asymptotically approaches the first target steering angle with the lapse of time.

As illustrated in FIG. 3A, at time $t_5$, the actual steering angle and the second target steering angle become equal to the first target steering angle, and the target steering angle setting unit 14 ends setting of the second target steering angle. The steering control unit 15 executes the steering control of the host vehicle V such that the host vehicle V travels in accordance with the first target steering angle. The steering wheel control unit 16 controls the rotation of the steering wheel 9 such that the steering wheel 9 rotates by a rotation angle corresponding to the first target steering angle. As a result, the automated driving apparatus 100a resumes the normal automated driving (S12).

The period from time $t_4$ to time $t_5$ at which the second target steering angle becomes equal to the first target steering angle may be a fixed period, or may be set to a shorter period as the difference between the actual steering angle and the first target steering angle is larger. When the host vehicle V is traveling on a curve and the direction of a steering operation by the driver of the host vehicle V is opposite to the direction of the curve, the period from time $t_4$ to time $t_5$ at which the second target steering angle becomes equal to the first target steering angle may be set relatively short. On the other hand, when the host vehicle V is traveling on a curve and the direction of a steering operation by the driver of the host vehicle V is the same as the direction of the curve, a high priority may be put on the driver's intention, so that the period from time $t_4$ to time $t_5$ at which the second target steering angle becomes equal to the first target steering angle may be set relatively long.

As illustrated in FIG. 3C, at time $t_5$ at which the actual steering angle and the second target steering angle become equal to the first target steering angle and the automated driving apparatus 100a resumes the normal automated driving, the host vehicle V need not be returned to the center of the lane. In this case, the automated driving apparatus 100a first resumes the normal automated driving, and then the host vehicle V is returned to the center of the lane by the automated driving.

In the present embodiment, the target steering angle setting unit 14 sets the first target steering angle corresponding to the traveling environment around the host vehicle V and the traveling state of the host vehicle V during the automated driving, and the target steering angle setting unit 14 sets the first target steering angle and the second target steering angle when a steering operation is detected during the automated driving. The steering wheel control unit 16 controls the rotation of the steering wheel 9 such that the steering wheel 9 is rotated in accordance with the first target steering angle during the automated driving, and when a steering operation is detected during the automated driving, the steering wheel 9 rotates by a rotation angle corresponding to the second target steering angle. Furthermore, the target steering angle setting unit 14 sets the second target steering angle that asymptotically approaches the actual steering angle from the first target steering angle with the lapse of time during the period from when a steering operation is detected during the automated driving until when the end of the steering operation is detected, and the target steering angle setting unit 14 sets the second target steering angle that asymptotically approaches the first target steering angle with the lapse of time, after the end of the steering operation detected during the automated driving is detected. Thus, when a steering operation of the steering wheel 9 by the driver of the host vehicle V takes place during the automated driving, the reaction force applied to the steering wheel 9 operated by the driver gradually decreases, and when the steering operation no longer takes place, the reaction force applied to the steering wheel 9 operated by the driver gradually increases. As a result, it is possible to enhance the ease of operation by the driver and the stability of the behavior of the host vehicle V when a steering operation of the steering wheel 9 by the driver of the host vehicle takes place during the automated driving and when the steering operation no longer takes place.

Second Embodiment

Figure 4:
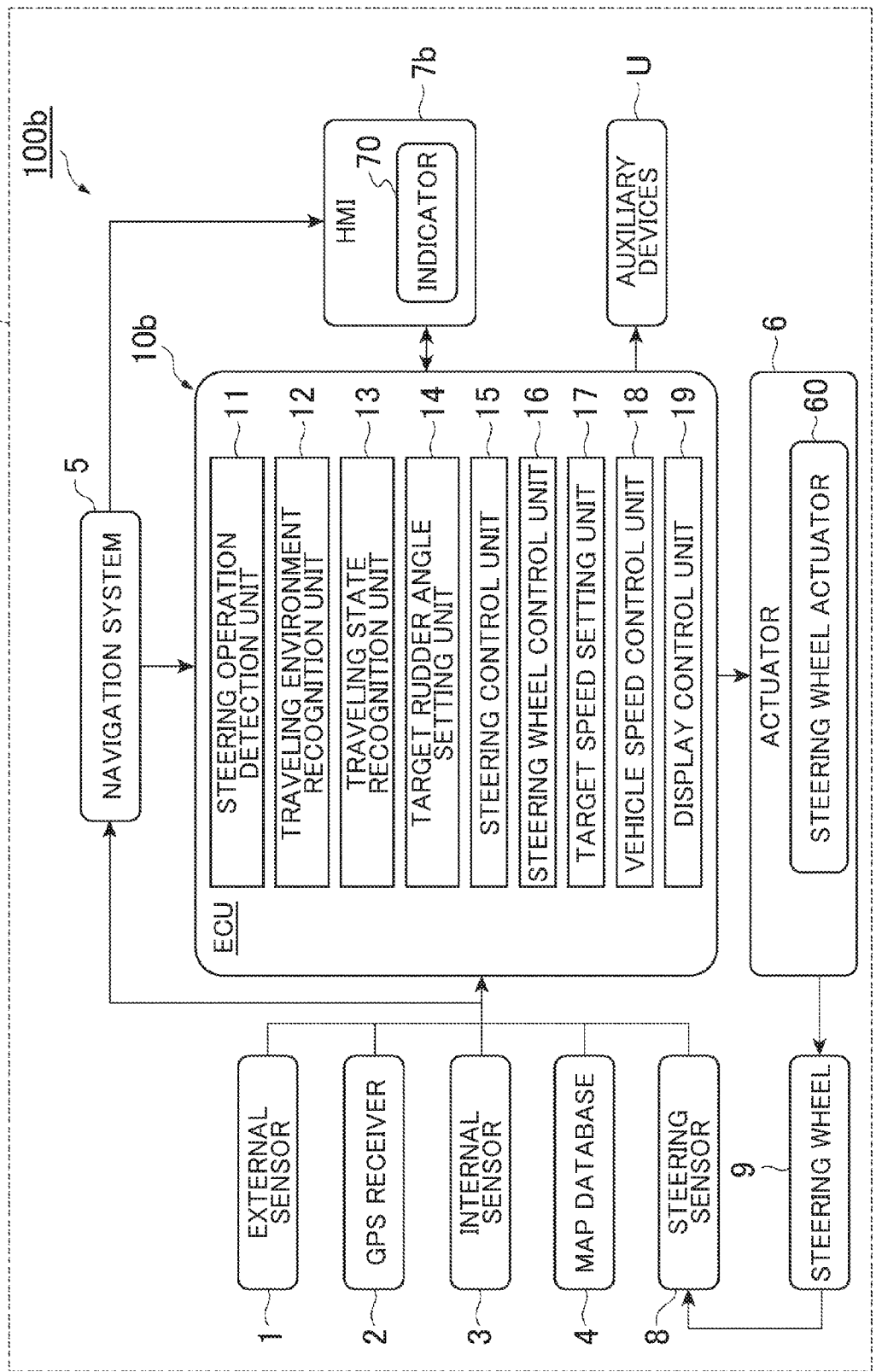
FIG. 4 is a block diagram illustrating the configuration of an automated driving apparatus according to a second embodiment.

Hereinafter, a second embodiment of the present disclosure will be described. The present embodiment is different from the first embodiment, in that the driver of the host vehicle V is notified of whether or not a steering operation by the driver is detected. As illustrated in FIG. 4, an automated driving apparatus 100b of the present embodiment has the configuration of the first embodiment, and further includes an indication control unit 19 provided in an electronic control unit (ECU) 10b. The automated driving apparatus 100b has the configuration of the first embodiment, and further includes an indicator 70 provided in an HMI 7b.

When a steering operation by the driver of the host vehicle V is not detected by the steering operation detection unit 11, the indication control unit 19 causes the indicator 70 of the host vehicle V to indicate a steering operation non-detection indication (first indication) for notifying the driver of the host vehicle V that a steering operation is not detected. When a steering operation is detected by the steering operation detection unit 11, the indication control unit 19 causes the indicator 70 to indicate a steering operation detection indication (second indication) for notifying the driver of the host vehicle V that a steering operation is detected.

The indicator 70 is a device provided on, for example, an instrument panel to indicate icons. The indicator 70 indicates an icon of a steering operation non-detection indication indicating that a steering operation is not detected, and an icon of a steering operation detection indication indicating that a steering operation is detected, as described later. The indicator 70 may indicate a steering operation non-detection indication and a steering operation detection indication in the forms other than icons, such as moving images or voices.

Figure 5A:
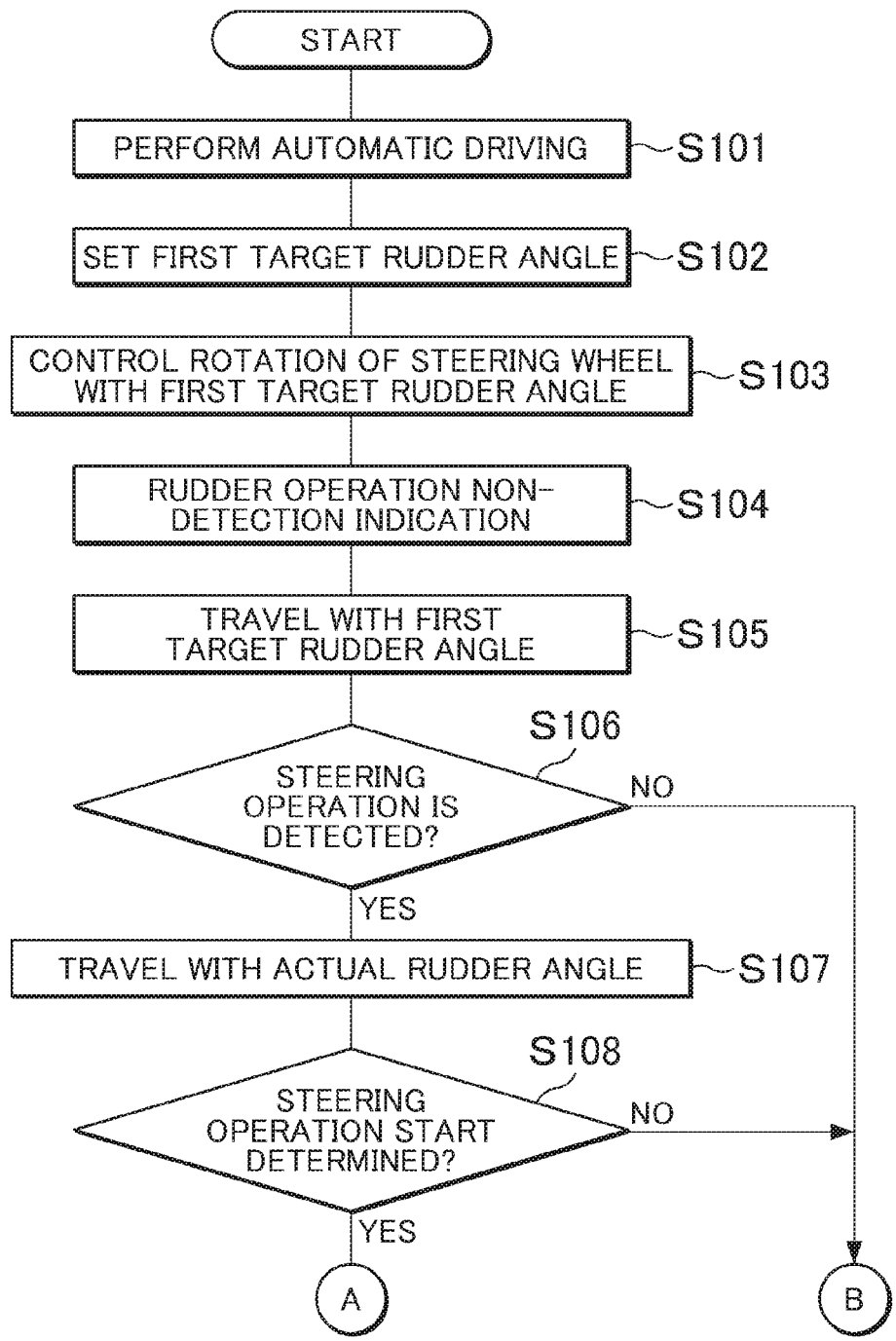
FIG. 5A is a flowchart illustrating the operation of the automated driving apparatus in FIG. 4.
Figure 5B:
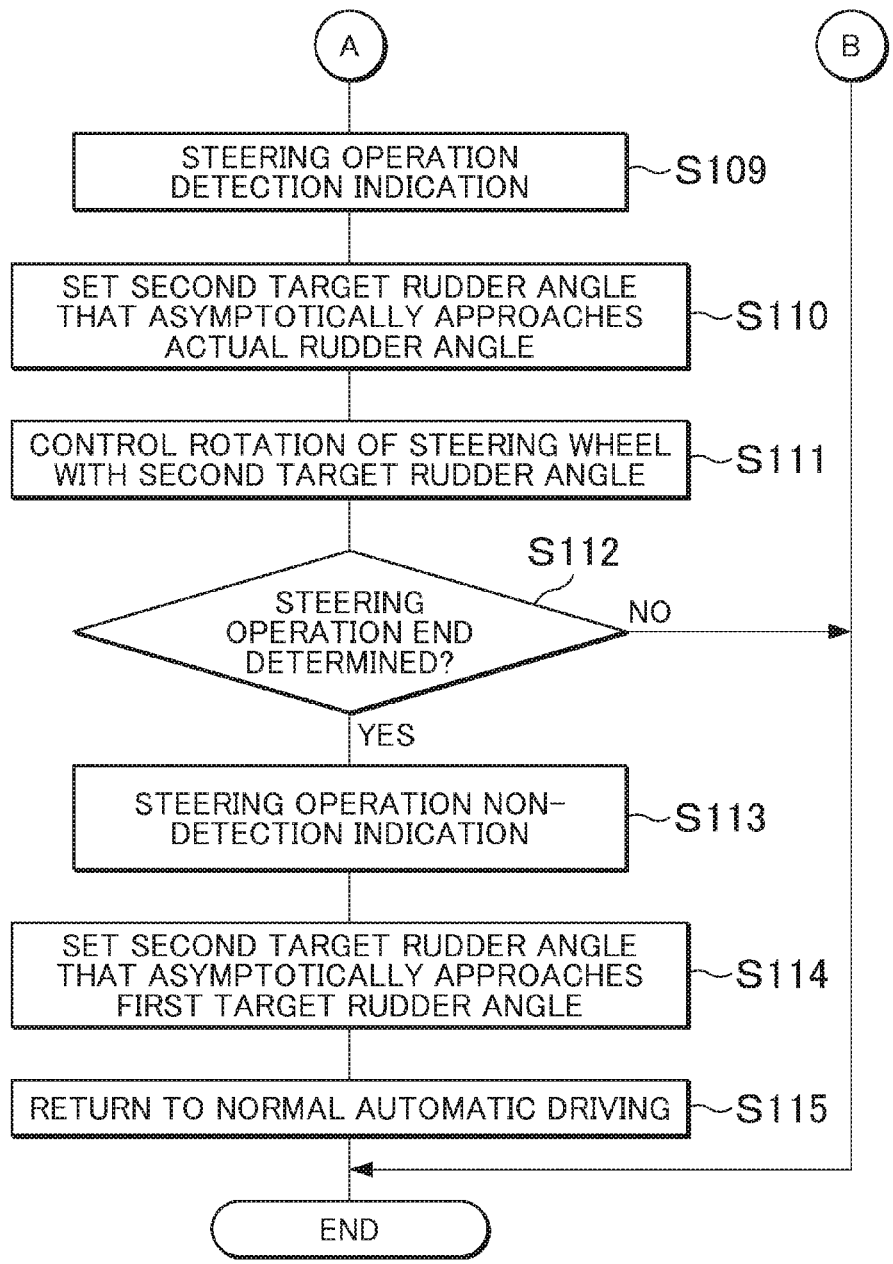
FIG. 5B is a flowchart illustrating the operation of the automated driving apparatus in FIG. 4.

Hereinafter, an operation of the automated driving apparatus 100b in the present embodiment will be described. As illustrated in FIGS. 5A and 5B, processes in S101 to S103 that are the same as the processes in S1 to S3 in FIG. 2 in the first embodiment are executed by the automated driving apparatus 100b. In this case, since a steering operation by the driver of the host vehicle V is not detected by the steering operation detection unit 11, the indication control unit 19 of the ECU 10b causes the indicator 70 of the host vehicle V to indicate a steering operation non-detection indication for notifying the driver of the host vehicle V that a steering operation is not detected (S104).

Figure 6E:
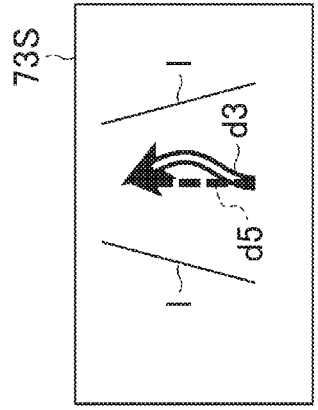
FIG. 6E is a view illustrating an example of a steering operation detection indication.
Figure 6F:
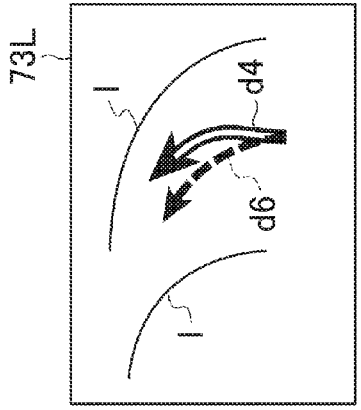
FIG. 6F is a view illustrating an example of a steering operation detection indication.
Figure 6C:
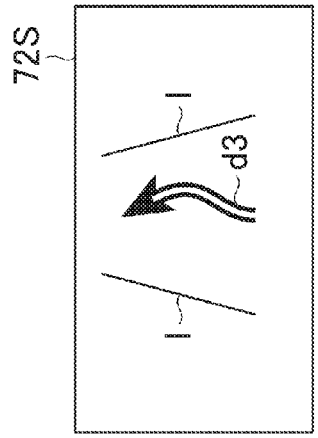
FIG. 6C is a view illustrating an example of a steering operation detection indication.
Figure 6D:
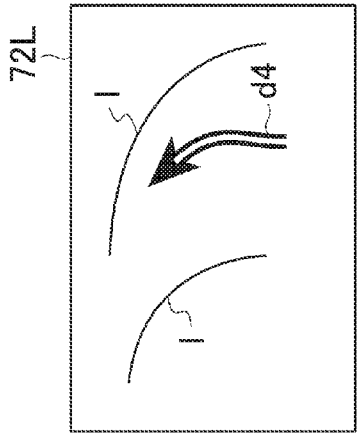
FIG. 6D is a view illustrating an example of a steering operation detection indication.
Figure 6A:
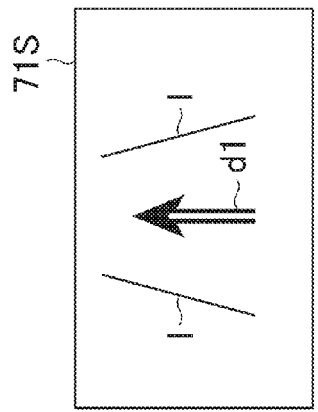
FIG. 6A is a view illustrating an example of a steering operation non-detection indication.
Figure 6B:
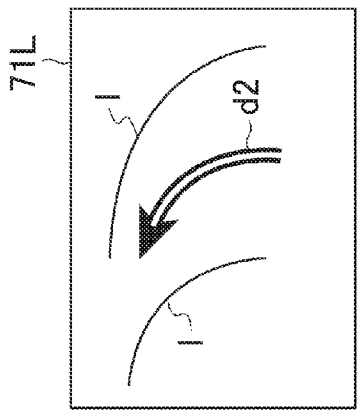
FIG. 6B is a view illustrating an example of a steering operation non-detection indication.

When the traveling environment recognition unit 12 recognizes that the host vehicle V is traveling on a straight path, the indication control unit 19 causes the indicator 70 to indicate, for example, a steering operation non-detection indication 71S as illustrated in FIG. 6A. As illustrated in FIG. 6A, the steering operation non-detection indication 71S includes lane indications 1 that are icons representing lane boundary lines of the straight path and a direction indication $d_1$ indicating that the host vehicle V is traveling straight ahead in accordance with the first target steering angle. When the traveling environment recognition unit 12 recognizes that the host vehicle V is traveling on a left-hand curve, the indication control unit 19 causes the indicator 70 to indicate, for example, a steering operation non-detection indication 71L as illustrated in FIG. 6B. As illustrated in FIG. 6B, the steering operation non-detection indication 71L includes lane indications 1 that are icons representing lane boundary lines of the left-hand curve and a direction indication $d_2$ indicating that the host vehicle V is turning left in accordance with the first target steering angle.

As illustrated in FIGS. 5A and 5B, processes in S105 to S108 that are the same as the processes in S4 to S7 in FIG. 2 in the first embodiment are executed by the automated driving apparatus 100b. When the start of a steering operation is detected, the indication control unit 19 causes the indicator 70 of the host vehicle V to indicate a steering operation detection indication for notifying the driver of the host vehicle that a steering operation is detected (S109).

When the traveling environment recognition unit 12 recognizes that the host vehicle V is traveling on a straight path, the indication control unit 19 causes the indicator 70 to indicate, for example, a steering operation detection indication 72S as illustrated in FIG. 6C. As illustrated in FIG. 6C, the steering operation detection indication 72S includes lane indications 1 that are icons representing lane boundary lines of the straight path and a direction indication $d_3$ indicating that the second target steering angle is set. When the traveling environment recognition unit 12 recognizes that the host vehicle V is traveling on a left-hand curve, the indication control unit 19 causes the indicator 70 to indicate, for example, a steering operation detection indication 72L as illustrated in FIG. 6D. As illustrated in FIG. 6D, the steering operation detection indication 72L includes lane indications 1 that are icons representing lane boundary lines of the left-hand curve and a direction indication $d_4$ indicating that the second target steering angle is set.

When the traveling environment recognition unit 12 recognizes that the host vehicle V is traveling on a straight path, the indication control unit 19 may cause the indicator 70 to indicate, for example, a steering operation detection indication 73S as illustrated in FIG. 6E. As illustrated in FIG. 6E, the steering operation detection indication 73S includes lane indications 1 that are icons representing lane boundary lines of the straight path, a direction indication $d_3$ indicating that the second target steering angle is set, and a direction indication $d_5$ indicating that the first target steering angle is set. When the traveling environment recognition unit 12 recognizes that the host vehicle V is traveling on a left-hand curve, the indication control unit 19 may cause the indicator 70 to indicate, for example, a steering operation detection indication 73L as illustrated in FIG. 6F. As illustrated in FIG. 6F, the steering operation detection indication 73L includes lane indications 1 that are icons representing lane boundary lines of the left-hand curve, a direction indication $d_4$ indicating that the second target steering angle is set, and a direction indication $d_6$ indicating that the first target steering angle is set.

As illustrated in FIGS. 5A and 5B, processes in S110 to S112 that are the same as the processes in S8 to S10 in FIG. 2 in the first embodiment are executed by the automated driving apparatus 100*b*. When the end of the steering operation is detected, the indication control unit 19 causes the indicator 70 of the host vehicle V to indicate the steering operation non-detection indication 71S, 71L, or the like to notify the driver of the host vehicle V that a steering operation is not detected (S113). Processes in S114 to S115 that are the same as the processes in S11 to S12 in FIG. 2 in the first embodiment are executed by the automated driving apparatus 100*b*.

Switchover from the steering operation non-detection indications 71S, 71L or the like to the steering operation detection indications 72S, 72L, 73S, 73L or the like may be made at the time when a steering operation is detected and the steering control of the host vehicle V is executed in accordance with the actual steering angle, instead of at the time when a steering operation is detected.

According to the present embodiment, when a steering operation is not detected by the steering operation detection unit 11 and when the end of a steering operation is detected by the steering operation detection unit 11, the indication control unit 19 causes the indicator 70 to indicate the steering operation non-detection indication 71S, 71L or the like to notify the driver of the host vehicle V that a steering operation is not detected. On the other hand, when a steering operation is detected by the steering operation detection unit 11, the indication control unit 19 causes the indicator 70 to indicate the steering operation detection indication 72S, 72L, 73S, 73L or the like to notify the driver of the host vehicle V that a steering operation is detected. This enables the driver to recognize whether or not the automated driving apparatus 100*b* detects a steering operation by the driver and controls the rotation of the steering wheel 9 based on the detection.

While the embodiments of the present disclosure have been described above, the present disclosure is not limited to the above-described embodiments and may be implemented in various other embodiments.

What is claimed is:

1. An automated driving apparatus configured to execute automated driving of a host vehicle in accordance with a first target steering angle while controlling rotation of a steering wheel such that the steering wheel rotates by a rotation angle corresponding to the first target steering angle, and the automated driving apparatus configured to cause the host vehicle to temporarily travel in accordance with an actual steering angle corresponding to a rotation angle of the steering wheel when a steering operation of the steering wheel by a driver of the host vehicle takes place during the automated driving, the automated driving apparatus comprising:

a steering operation detection unit configured to detect the steering operation;

a target steering angle setting unit configured to set the first target steering angle corresponding to a traveling environment around the host vehicle and a traveling state of the host vehicle during the automated driving, and target steering angle setting unit configured to set the first target steering angle and a second target steering angle based on the first target steering angle and the actual steering angle when the steering operation is detected by the steering operation detection unit during the automated driving;

a steering control unit configured to execute steering control of the host vehicle in accordance with the first target steering angle during the automated driving, and the steering control unit configured to execute the steering control of the host vehicle in accordance with the actual steering angle when the steering operation is detected by the steering operation detection unit during the automated driving; and a steering wheel control unit configured to control the rotation of the steering wheel such that the steering wheel rotates by the rotation angle corresponding to the first target steering angle during the automated driving, and the steering wheel control unit configured to control the rotation of the steering wheel such that the steering wheel rotates by a rotation angle corresponding to the second target steering angle when the steering operation is detected by the steering operation detection unit during the automated driving, wherein the target steering angle setting unit is configured to set the second target steering angle that asymptotically approaches the actual steering angle from the first target steering angle with a lapse of time, within a period from when the steering operation is detected by the steering operation detection unit during the automated driving until when an end of the steering operation is detected by the steering operation detection unit, and the target steering angle setting unit is configured to set the second target steering angle that asymptotically approaches the first target steering angle with the lapse of time, after the steering operation detection unit detects the end of the steering operation detected by the steering operation detection unit during the automated driving.

2. The automated driving apparatus according to claim 1, further comprising
   an indication control unit configured to cause an indicator of the host vehicle to indicate a steering operation non-detection indication for notifying the driver of the host vehicle that the steering operation is not detected, when the steering operation is not detected by the steering operation detection unit and when the end of the steering operation is detected by the steering operation detection unit, and the indication control unit configured to cause the indicator to indicate a steering operation detection indication for notifying the driver of the host vehicle that the steering operation is detected, when the steering operation is detected by the steering operation detection unit.

3. An automated driving system configured to execute automated driving of a host vehicle in accordance with a first target steering angle while controlling rotation of a steering wheel such that the steering wheel rotates by a rotation angle corresponding to the first target steering angle, and the automated driving system configured to cause the host vehicle to temporarily travel in accordance with an actual steering angle corresponding to a rotation angle of the steering wheel when a steering operation of the steering wheel by a driver of the host vehicle takes place during the automated driving, the automated driving system comprising:

a steering sensor that detects and outputs an amount of the steering operation of the steering wheel;

a steering actuator that controls a steering angle of the host vehicle;

a steering wheel actuator that controls a torque to be applied to the steering wheel; and an electronic controller configured to:

detect the steering operation;

set the first target steering angle corresponding to a traveling environment around the host vehicle and a traveling state of the host vehicle during the automated driving, and set the first target steering angle and a second target steering angle based on the first target steering angle and the actual steering angle when the steering operation is detected during the automated driving;

control the steering actuator based on the first target steering angle during the automated driving, and control the steering actuator based on the actual steering angle when the steering operation is detected during the automated driving; and control the steering wheel actuator such that the steering wheel rotates by the rotation angle corresponding to the first target steering angle during the automated driving, and control the steering wheel actuator such that the steering wheel rotates by a rotation angle corresponding to the second target steering angle when the steering operation is detected during the automated driving, wherein the electronic controller is configured to set the second target steering angle that asymptotically approaches the actual steering angle from the first target steering angle with a lapse of time, within a period from when the steering operation is detected during the automated driving until when an end of the steering operation is detected, and the electronic controller is configured to set the second target steering angle that asymptotically approaches the first target steering angle with the lapse of time, after the end of the steering operation detected during the automated driving is detected.

4. The automated driving system according to claim 3, further comprising an indicator, wherein:

the electronic controller is configured to cause the indicator to indicate a first indication for notifying the driver of the host vehicle that the steering operation is not detected, when the steering operation is not detected; and the electronic controller is configured to cause the indicator to indicate a second indication for notifying the driver of the host vehicle that the steering operation is detected, when the steering operation is detected.

* * * * *